(12) United States Patent
Sasselli et al.

(10) Patent No.: US 6,411,281 B1
(45) Date of Patent: Jun. 25, 2002

(54) MOUSE WITH BATTERY COMPARTMENT ON TOP

(75) Inventors: Nicolas Sasselli, Lausanne; Aldo Bussien, Vullierens, both of (CH); Denis O'Keeffe, Newmarket (IE)

(73) Assignee: Logitech, Inc., Fremont, CA (US)

( * ) Notice: Subject to any disclaimer, the term of this patent is extended or adjusted under 35 U.S.C. 154(b) by 0 days.

(21) Appl. No.: 09/441,933

(22) Filed: Nov. 17, 1999

Related U.S. Application Data

(60) Provisional application No. 60/124,223, filed on Mar. 12, 1999.

(51) Int. Cl.[7] ................................................ G09G 5/08
(52) U.S. Cl. ...................................................... 345/163
(58) Field of Search ................................ 345/163–166; D14/402, 403

(56) References Cited

U.S. PATENT DOCUMENTS 5,654,870 A * 8/1997 Havener ..................... 361/600
5,854,621 A * 12/1998 Junod et al. ................. 345/158
5,912,661 A * 6/1999 Siddiqui ..................... 345/166
6,200,219 B1 * 3/2001 Rudell et al. ................. 463/37
6,225,981 B1 * 5/2001 Lu ............................. 345/164

FOREIGN PATENT DOCUMENTS

JP          63172324 A  *  7/1988  ........... G06F/3/033

* cited by examiner

Primary Examiner—Richard Hjerpe
Assistant Examiner—Alexander Eisen
(74) Attorney, Agent, or Firm—Townsend and Townsend and Crew LLP

(57) ABSTRACT

A cordless mouse with an upper and lower housing. The lower housing includes a hole for receiving a ball which extends through the hole in the bottom of the mouse. The upper housing is uniquely provided with a cavity for receiving a battery, with a portion of the cavity extending over the ball.

9 Claims, 6 Drawing Sheets

MOUSE WITH BATTERY COMPARTMENT ON TOP

STATEMENT OF RELATED APPLICATIONS

This application claims priority from U.S. Provisional Application No. 60/124,223, filed Mar. 12, 1999, having the same title, and the contents of which are incorporated herein by reference.

BACKGROUND OF THE INVENTION

The present invention relates to wireless computer mice using a battery, and in particular to a wireless mouse with a roller.

Wireless computer mice have been developed to eliminate the need for a cord, and to make it easier for a user to move the mouse around without having to drag a cord. Examples of such wireless mice can be found, for example, in U.S. Pat. Nos. 4,754,268; 5,541,621; 5,854,621; and 5,563,630. A typical configuration for the battery in such a mouse is shown in Patent No. Des. 356,558. As shown, the battery is mounted in a compartment on the bottom of the mouse.

Recently, many mice have had a roller added to them for a scrolling function. The roller protrudes through the top of the mouse where it can be activated by the user's finger to roll it back and forth. Typically, it is positioned between or near the buttons on the front of the mouse. Examples of such rollers may be found, for example, in U.S. Pat. Nos. 5,298,919; 5,313,229; 5,313,230; 5,446,481; 5,473,344; and 5,530,455.

One of the challenges in the design of a mouse which adds a roller and is also cordless is fitting all the components compactly into the mouse. Such components include the ball for the mouse with its associated encoder wheels and circuitry, the roller wheel and its support mechanism, the battery and transmitter circuitry, and the circuit boards. In addition, it is desirable to maintain the ease of moving the mouse around while loaded with the weight and bulk of all these extra components.

SUMMARY OF THE INVENTION

The present invention provides a cordless mouse with an upper and lower housing. The lower housing includes a hole for receiving a ball which extends through the hole in the bottom of the mouse. The upper housing is uniquely provided with a cavity for receiving a battery, with a portion of the cavity extending over the ball.

The positioning of the battery cavity at least partially over the ball on top of the mouse serves multiple purposes. First, it allows more room in the lower housing for other components, rather than having two batteries in the compartment in the lower housing as in the typical prior art configuration. In addition, having the weight of the batteries at least partially over the ball ensures that the center of gravity is close to being over the ball of the mouse, providing good contact in the presence of the extra weight of the batteries, ensuring that a good signal is obtained by moving the ball around.

In a preferred embodiment, the cordless mouse contains a roller at the front end adjacent or in-between the buttons at the front of the mouse. The battery compartment is placed at the rear portion of the mouse, extending from the rear portion to over the center above the ball cage of the mouse.

In one embodiment, a top cover for the mouse serves as a cover for the battery compartment. The top cover can be opened by a latch, and is spring-loaded so that upon activation of the latch, the cover comes partially off, making it easy for a user to see how to open the top cover. In a preferred embodiment, the cover extends across the entire top of the mouse and slides backward under spring activation. This preserves the aesthetics of the top of the mouse. The preservation of the aesthetics makes it difficult to see how to open the cover with the latch, which is solved by providing the springs to slide the cover backward and illustrate to the user which direction to pull.

For a further understanding of the nature and advantages of the invention, reference should be made to the following description in conjunction with the accompanying drawings.

DESCRIPTION OF THE SPECIFIC EMBODIMENTS

Figure 1:
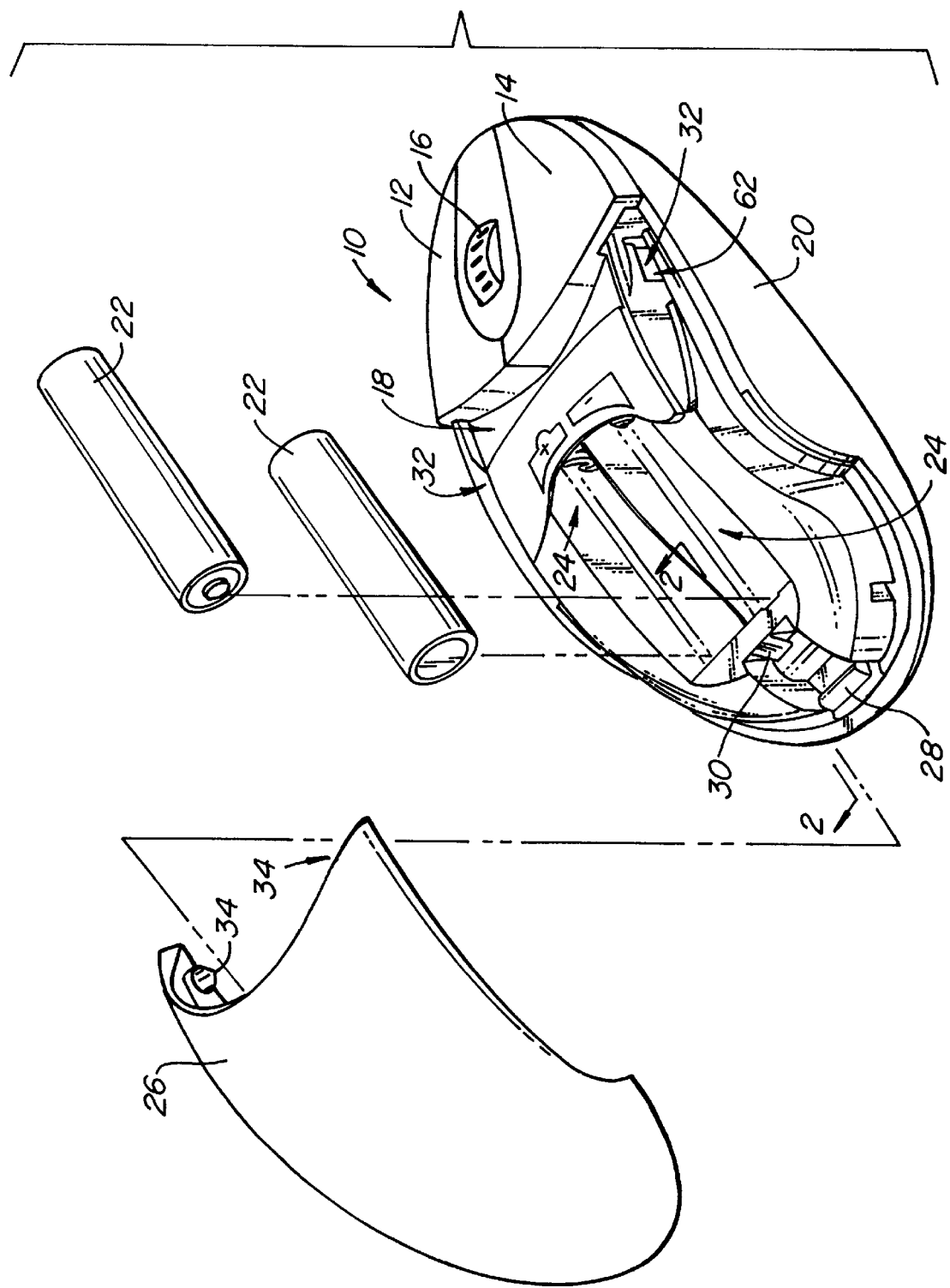
FIG. 1 is an exploded, perspective view of one embodiment of mouse with a battery cavity according to the invention.

FIG. 1 illustrates a cordless mouse 10 according to one embodiment of the present invention. At the front of the mouse are shown two buttons 12 and 14. Inbetween the buttons is a roller 16 protruding through an opening in the upper housing 18. The upper housing is mounted over a lower housing 20 inside of which is a ball and encoding mechanism, shown in subsequent figures.

A pair of batteries 22 fit into cavities 24. A front end of the cavities lies over the mouse ball, as shown in subsequent figures. Thus, instead of the weight of the batteries being underneath the mouse behind or in front of the mouse ball, they are mounted on top and over the ball, adding their weight to the mouse in the area around the mouse ball. Markings of + and − are on the extension of the keyplate which extends over the batter cavity. This simplifies the ability to determine where the corresponding batteries go.

A top cover 26 is shown removed. Cover 26 is held in place by a latch 28. When latch 28 is activated, as shown better in subsequent figures, a spring 30 pushes it backwards, in conjunction with an additional spring 32 extending out the two sides of the mouse (with only the right side visible in this view). Spring 32 is biased against a nub 34 on either side of the battery cover. Lines 2—2 of FIG. 1 indicate a sectional view which is shown in FIG. 2.

Figure 2:
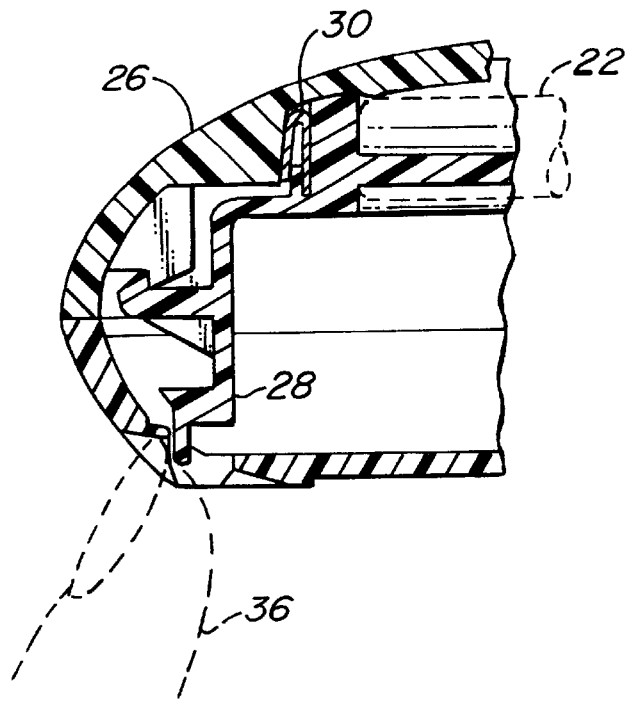
FIGS. 2 and 3 are side, sectional views illustrating the activation of a latch to release the top cover of FIG. 1.
Figure 3:
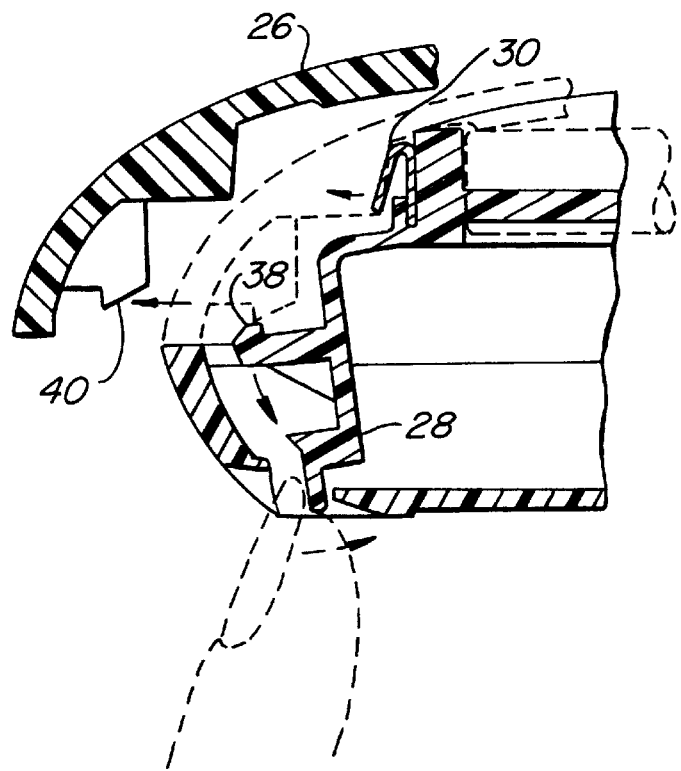

FIGS. 2 and 3 are sectional views illustrating the positioning of latch 28 and spring 30. As can be seen, when a finger 36 presses on latch 28, cover 26 will pop backward as illustrated in FIG. 3. FIG. 3 shows cover 36 having been pushed backward by the action of spring 30 when latch 28 is pressed inward, lowering hook 38 which is normally engaged with ledge 40 of cover 26. This spring action allows the user to observe which direction the cover needs to be pulled off. The spring moves the cover back slightly, with the user then sliding the cover backwards in the same direction to complete its removal. Spring 30 can be used in addition to, or instead of springs 32 shown in FIG. 1. Alternately, spring 30 could be eliminated and springs 32 could be used by themselves, or a spring could be placed in any other position, or the spring could be attached to the top cover instead of the upper housing.

Figure 4:
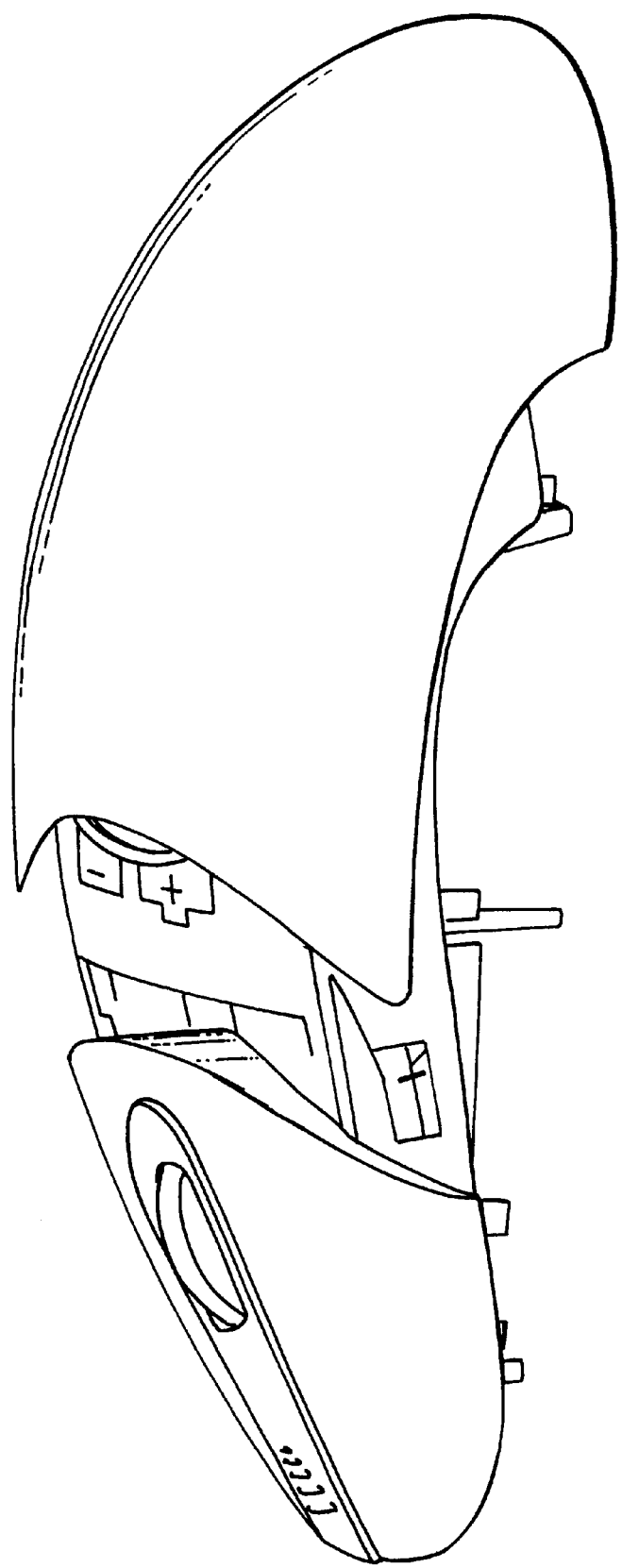
FIG. 4 is a perspective view of the top housing of a mouse with the top cover partially removed.

FIG. 4 illustrates in perspective view the partially removed top cover from the upper housing of the mouse. The amount of removal is exaggerated from that which would be caused by the spring force, which would indicate to the user which direction to remove the cover.

Figure 5:
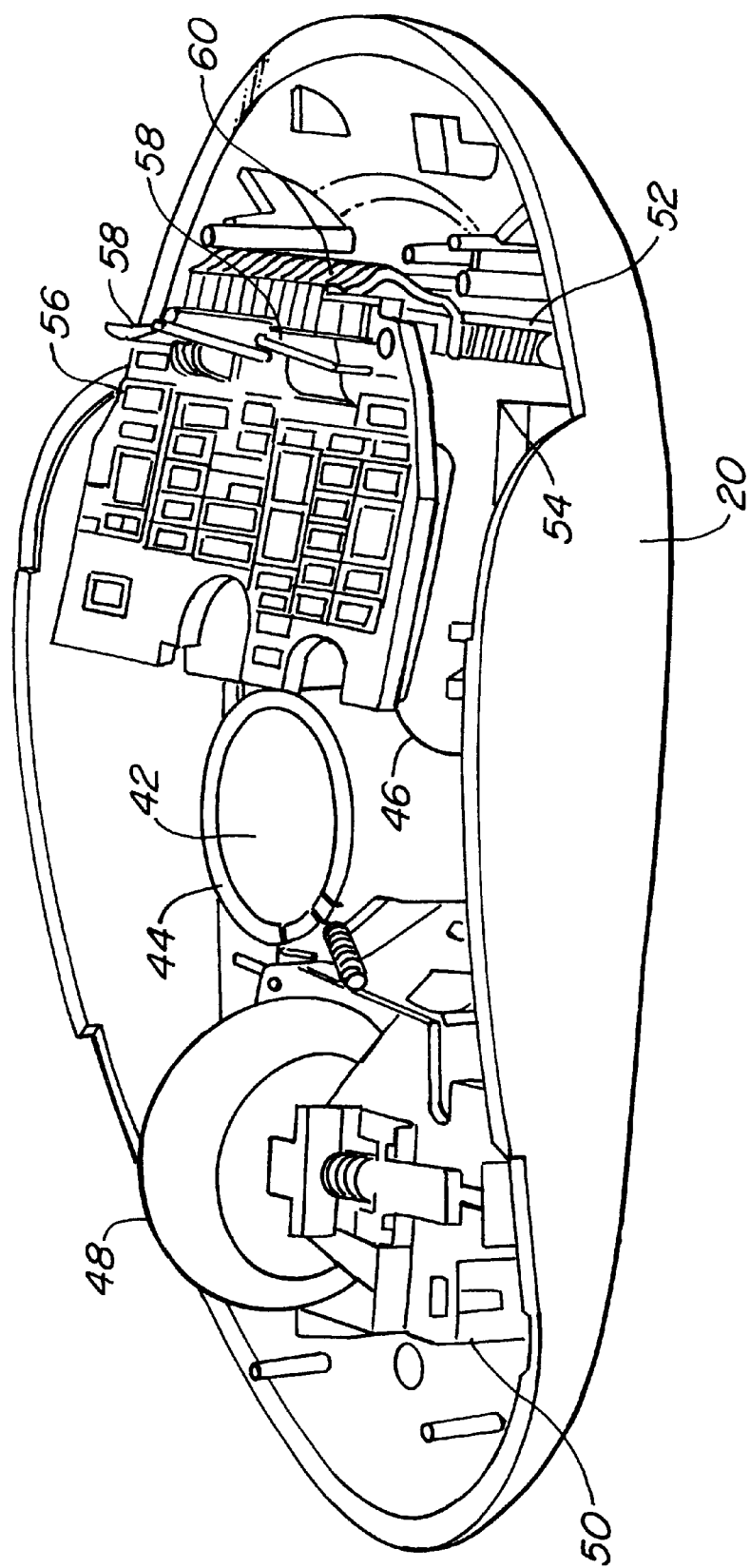
FIG. 5 is a perspective view of the lower housing with associated circuit boards.

FIG. 5 is a perspective view of the lower housing 20 with the upper housing removed. Shown is a mouse ball 42 enclosed in a ball cage 44. Adjacent the ball cage can be seen one of the encoder wheels 46. In front of the ball, is shown a roller 48 with its associated support structure and circuitry. Also shown are the switches, such as a microswitch 50 which is activated by one of the buttons on the top of the upper housing of the mouse.

Behind the ball cage 44 there is a two-level circuit board structure. A first circuit board 52 extends around the ball cage to the front to hold both the roller and support mechanism and switches in front, as well as the circuitry behind the ball cage. The circuitry behind the ball cage includes a microprocessor chip 54 for processing the encoder signals from the ball and roller movement. A second, upper circuit board 56 is shown for holding battery contacts 58, as well as, on the underside of the view shown, the transmitters for transmitting the wireless signal. As can be seen, the upper circuit board is connected to the lower circuit board by a flexible cable 60.

An advantage of the two circuit board structure is that during manufacture, they can laid down with the upper board behind the main board. Flexible cable 60 can then be soldered to both boards, and then bent backwards to flip the upper circuit board 56 backward and over the top of the main circuit board 52 to the position shown in FIG. 5. The positioning of the batteries in the upper housing allows them to uniquely interact with the circuit board structure to make contact with the contacts 58 on the upper circuit board while not taking up room needed by the components on the main circuit board.

Figure 6:
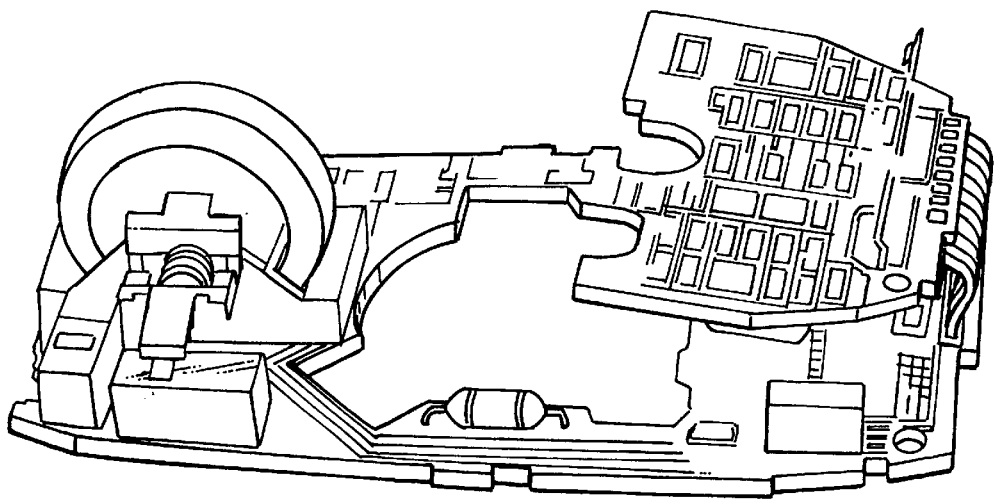
FIG. 6 is a perspective view of the circuit boards alone before mounting in the housing.

FIG. 6 is a view of the circuit board of FIG. 5 without the lower housing, to demonstrate its shape in more detail, in particular showing how the circuit board is arranged around the ball 42 and ball cage 44.

Figure 7:
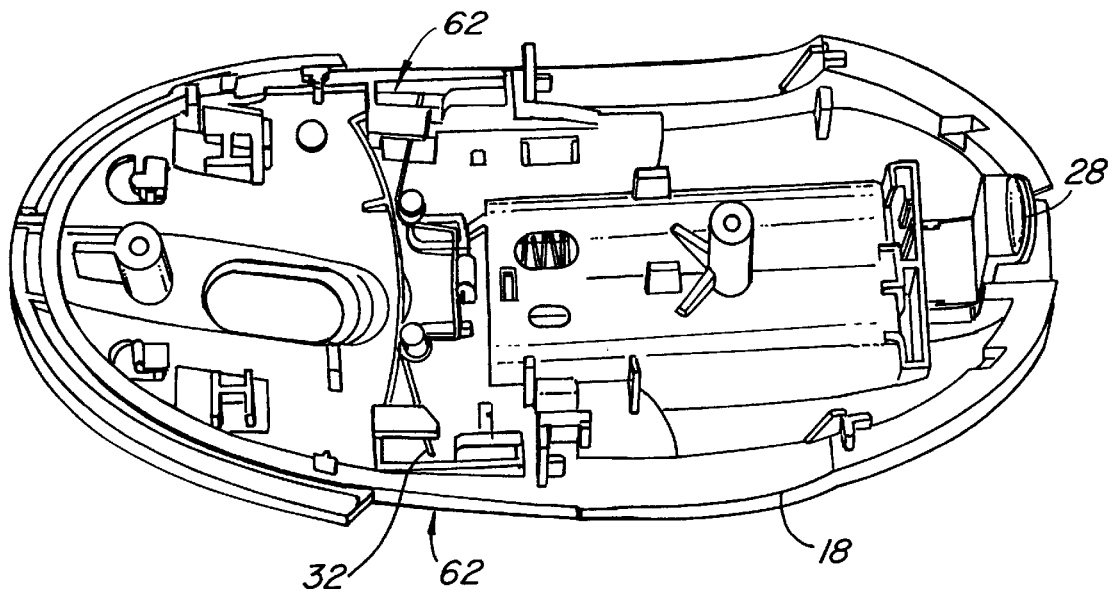
FIG. 7 is a perspective view of the underside of the upper housing of the mouse.

FIG. 7 is a perspective view of the underside of the upper housing 18. In particular, this gives a better view of spring 32, which extends across the width of the upper housing and out into two slots 62 on the sides, as shown better in FIG. 1.

Figure 8:
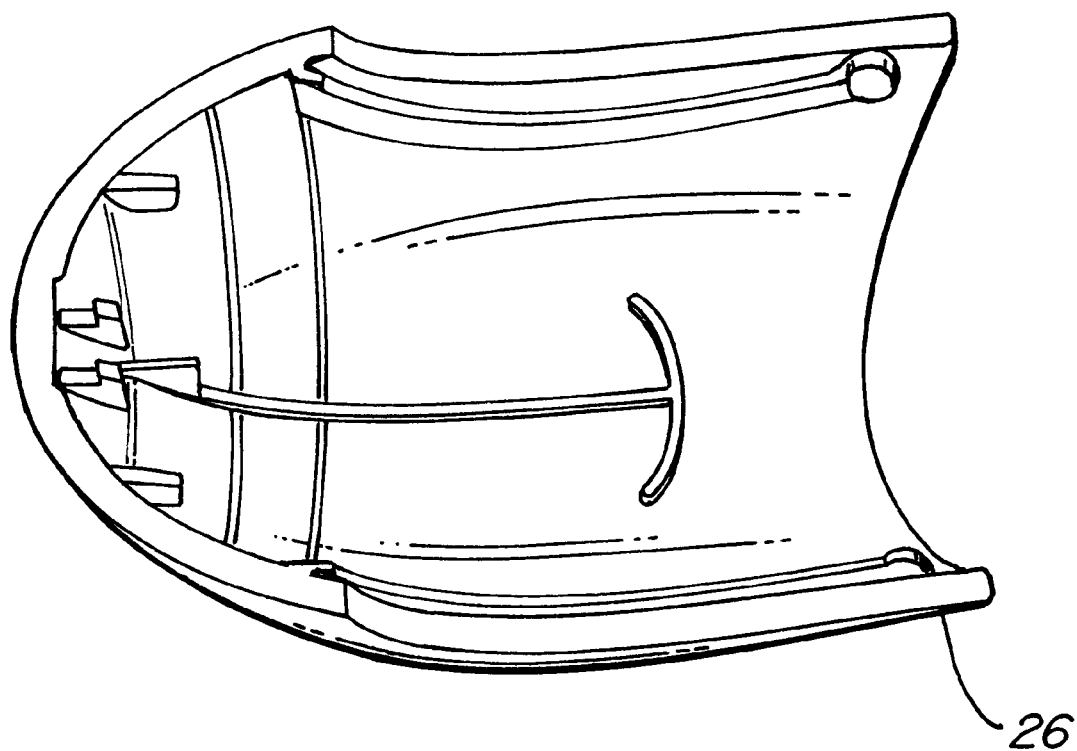
FIG. 8 is a perspective view of the underside of the top cover of the mouse.

FIG. 8 shows the underside of top cover 26 of FIG. 1.

As will be understood by those of skill in the art, the present invention may be embodied in other specific forms without departing from the essential characteristics thereof. Accordingly, the foregoing description is intended to be illustrative, but not limiting, of the scope of the invention which is set forth in the following claims.

What is claimed is:

1. A cordless mouse comprising:
   a lower housing having an opening;
   a ball extending through said opening in said lower housing;
   an upper housing having a cavity for receiving a battery;
   a removable top cover extending across a top of said upper housing;
   a latch coupled to said top cover for releasing said top cover; and
   a spring biased between said top cover and said upper housing to initiate the separation of said top cover from said upper housing when said latch is operated.

2. The cordless mouse of claim 1 further comprising at least a pair of buttons on a front surface of said upper housing, and wherein said top cover extends from said buttons to a rear of said upper housing.

3. The cordless mouse of claim 2 wherein said latch is at a rear of said upper housing.

4. The cordless mouse of claim 1 herein said top cover is removable by sliding rearward.

5. The cordless mouse of claim 1 further comprising:
   a keyplate extending over a portion of said cavity; and
   markings on said keyplate indicating an orientation of batteries to be placed in said cavity.

6. A cordless mouse comprising:
   a lower housing having an opening;
   a ball extending through said opening in said lower housing;
   an upper housing having a cavity for receiving a battery, at least a portion of said cavity extending over said ball;
   a circuit board extending around said opening on top of said lower housing;
   a roller mounted to extend through a slot in said upper housing at a front of said mouse;
   a second circuit board mounted above said first circuit board between said ball and a rear of said mouse; and
   a flexible cable joining a rear of said first circuit board to a rear of said second circuit board.

7. The cordless mouse of claim 6 further comprising:
   a contact for said battery mounted on said second circuit board, and extending through said upped housing into said cavity for receiving a battery; and
   a transmitter mounted on said second circuit board.

8. A cordless mouse comprising:
   a lower housing having an opening;
   a ball extending through said opening in said lower housing;
   an upper housing having a cavity for receiving a battery, at least a portion of said cavity extending over said ball;
   a removable top cover extending across a top of said upper housing;
   a latch coupled to said top cover for releasing said top cover;
   a spring biased between said top cover and said upper housing to initiate the separation of said top cover from said upper housing when said latch is operated:
   a circuit board extending around said opening on top of said lower housing; and
   a roller mounted to extend through a slot in said upper housing at a front of said mouse;
   a second circuit board mounted above said first circuit board between said ball and a rear of said mouse; and
   a flexible cable joining a rear of said first circuit board to a rear of said second circuit board.

9. The cordless mouse of claim 8 further comprising:
   a contact for said battery mounted on said second circuit board, and extending through said upped housing into said cavity for receiving a battery; and
   a transmitter mounted on said second circuit board.

* * * * *